United States Patent [19]

La Chapelle

[11] 4,016,536
[45] Apr. 5, 1977

[54] SPEED WARNING DEVICE
[75] Inventor: Leo La Chapelle, Los Angeles, Calif.
[73] Assignees: Frank Rembert; Leo La Chapelle, both of Los Angeles, Calif. ; part interest to each
[22] Filed: Jan. 23, 1976
[21] Appl. No.: 651,947
[52] U.S. Cl. .................................. 340/62; 340/266; 200/61.41
[51] Int. Cl.² .......................................... B60Q 5/00
[58] Field of Search ............ 340/62, 263, 266, 104; 200/153 N, 61.13, 61.93, 61.44, 308, 56 R, 56 A, 61.41; 116/74, 124 L; 324/154 PB

[56] References Cited
UNITED STATES PATENTS
2,523,352  9/1950  Behr ................................. 200/56 R
2,887,679  5/1959  Curva .............................. 340/62 X
3,849,614  11/1974  Connery ..................... 200/61.93 X Primary Examiner—John W. Caldwell
Assistant Examiner—William M. Wannisky
Attorney, Agent, or Firm—Henry M. Bissell

[57] ABSTRACT

A speed alarm system which is actuated by the pointer of a speedometer. The device is completely self-contained and self-powered. It is adapted for attachment to the existing speedometer of an automobile or the like with a minimum of modification. It includes a battery powered audible oscillator which, when the battery circuit is closed to the oscillator, drives a transducer which generates an audible warning sound loud enough to be heard by the driver. Closure of the circuit is effected by a special type of switch in the shape of a small cylinder which may be inserted from the outside through a hole drilled in the plastic cover plate of the speedometer at the point at which the speed warning is to be sounded. The switch includes a hair-fine wire extending axially of the cylinder beyond the end thereof so that it may be moved by the speedometer pointer to contact a metallic sleeve of the activation switch, thus completing the circuit to energize the transducer.

12 Claims, 5 Drawing Figures

U.S. Patent   April 5, 1977   4,016,536
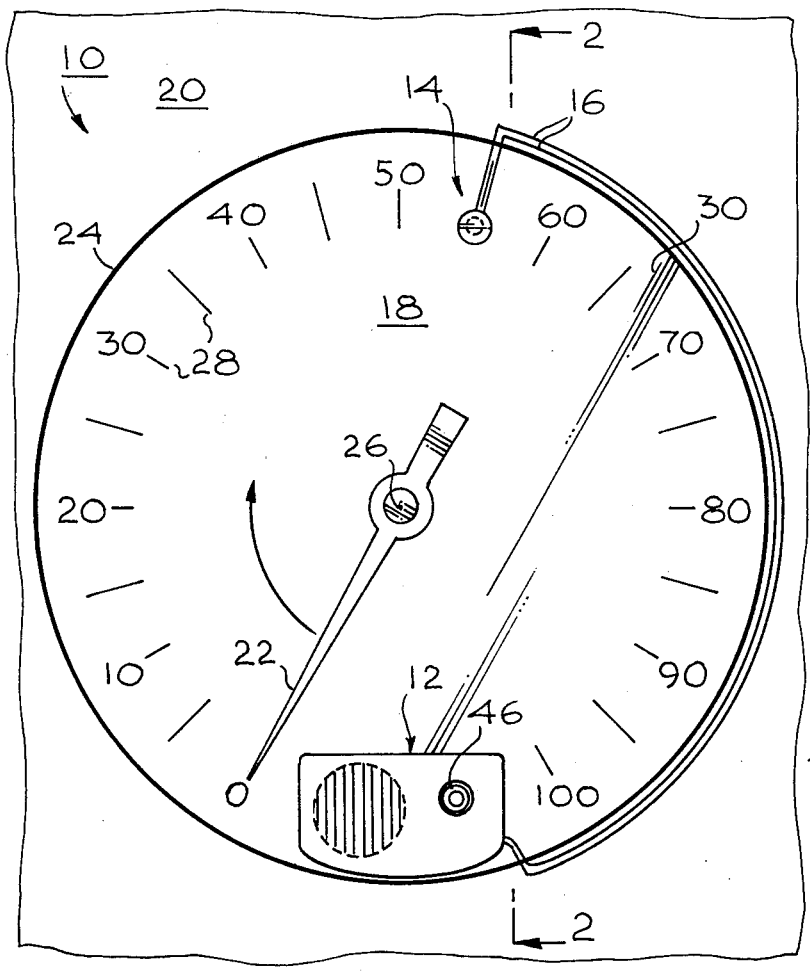
Fig. 1
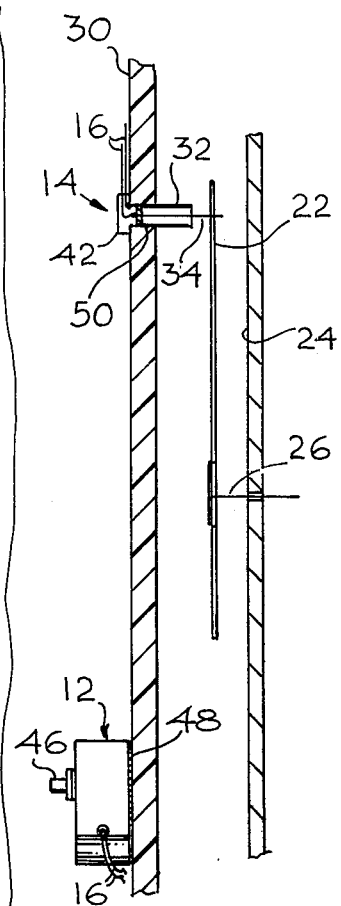
Fig. 2
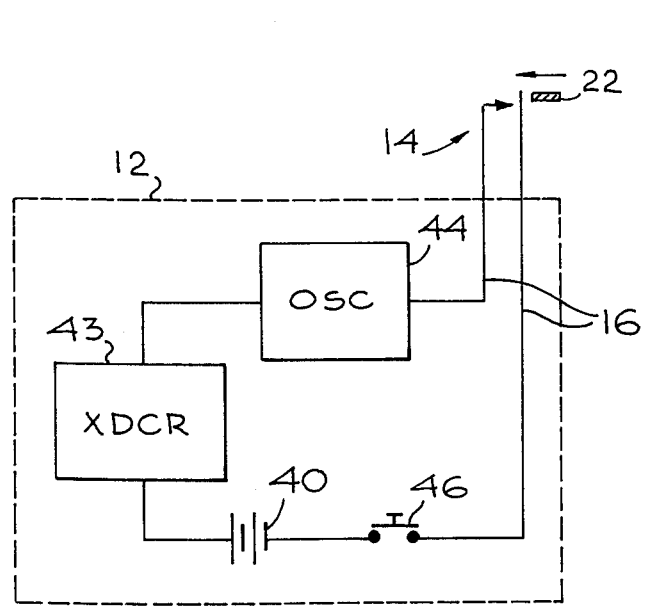
Fig. 4
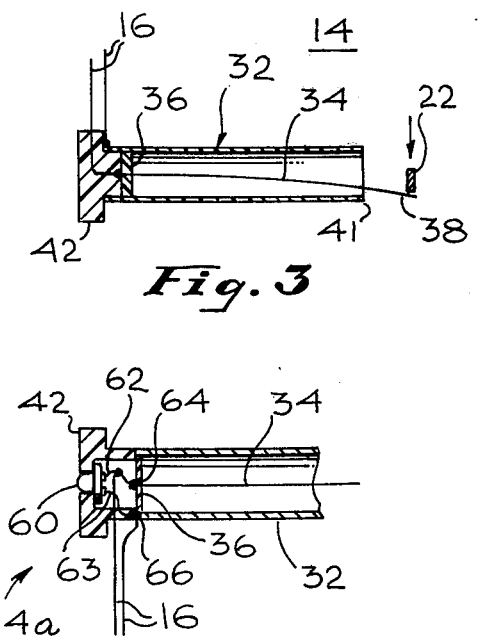
Fig. 3
Fig. 5

SPEED WARNING DEVICE

BACKGROUND OF THE INVENTION

1. Field of the Invention

This invention relates to speed warning devices and, more particularly, to a speed warning device which may be added to an existing speedometer installation.

2. Description of the Prior Art

Some vehicle speedometers are provided, usually as an extra cost option, with a speed warning device which serves to give an audible warning in the event that a certain speed is reached or exceeded. Such systems as are known generally include a first electrical contact, generally fixed in position and a second electrical contact mounted for movement with the speedometer pointer, so as to complete an electrical circuit to energize an associated audible alarm mechanism by touching the first contact when the speedometer pointer reaches a predetermined speed indication. In some instances the position of the first contact is adjustable and may be set by means of a knob extending outside the speedometer casing. Examples of such prior art systems are to be found in the Fairhurst U.S. Pat. No. 2,433,895 and the Matsumura U.S. Pat. No. 3,713,093. Some speed sensing systems are more elaborate and incorporate means for controlling the speed of an automobile within a pre-set range through the sensing of the position of the speedometer pointer or an element movable therewith. Such a system is disclosed in the Teves U.S. Pat. No. 1,453,368. Systems similar to te speed warning systems of the prior art are applicable to tachometers, which indicate engine RPM's. Such a system for tachometers is disclosed in the Magid U.S. Pat. No. 2,728,072.

As indicated, all such systems as are known involve the incorporation of special equipment within the speedometer unit which must either be installed on the vehicle as original equipment or must be substituted for the originally installed speedometer by retrofitting to the vehicle at considerable effort and expense. Heretofore it has been a desirable feature to have the capability of adjusting the speed at which the alarm will be sounded. This is because the maximum speeds established by law have varied substantially from state to state and even within a state have varied from highways to freeways, turnpikes or the like. Now, however, because of the imposition of federal controls as a result of the recent oil embargo and increased emphasis on conservation of petroleum resources, the maximum speed throughout the United States have been established at 55 miles per hour. This speed is substantially less than the speed at which drivers are accustomed to driving in many areas of this country and therefore it becomes more important than ever to provide some sort of a warning device to indicate to the driver of an automobile or his passengers when the vehicle is exceeding the standard speed limit. At the same time, it is no longer important to be able to vary the point at which the speed warning will be sounded. Most drivers would be satisfied to have the warning fixed at 55 miles per hour. However, with such systems as are known in the prior art, the cost of retrofitting vehicles with such speed warning systems is prohibitively expensive and therefore very few automobile owners will install such equipment on their vehicles, despite the increased need for a speed warning system. What is needed is simple, low-cost, effective and reliable speed warning system which may be installed on existing speedometer equipment with a minimum of effort and expense and without interfering with the effective operation of the speedometer.

SUMMARY OF THE INVENTION

In general, the invention is as described in the Abstract hereinabove. In brief, arrangements in accordance with the present invention include an electrical circuit comprising a battery, a power switch, a transducer, an oscillator or similar wave generator, and an activation switch, the last-mentioned item being adapted to be mounted in conjunction with an already-existing speedometer so as to sense the movement of the speedometer pointer or needle past a predetermined point. In accordance with an aspect of the invention, the activation switch is in the form of a very fine metal wire mounted coaxially with a small metal cylindrical sleeve and extending beyond the end thereof. The cylindrical sleeve is adapted for installation through the plastic cover plate of a speedometer in a small hole to be drilled by the installer at the selected point at which the speed warning is to be sounded. The cylindrical sleeve does not extend far enough to interfere with the movement of the speedometer pointer, although the fine metallic wire extends beyond the distal end of the sleeve to a position of interference with the speedometer pointer as it moves around the speedometer face. When the speedometer pointer reaches the metallic wire, it deflects it until electrical contact is made between the metallic wire and the metal sleeve, thus completing the circuit to the speed warning device and causing the device to sound an alarm. The driver may then reduce his speed slightly until the metallic wire no longer contacts the sleeve, thus interrupting the circuit, or he may, if he prefers, simply disable the circuit by turning off the power switch. He may also continue to increase the speed of the vehicle until the speedometer pointer moves past the metallic wire, at which point the metallic wire would return to its coaxial alignment relative to the metal sleeve and the circuit would be opened. In such a case, another temporary warning would be sounded when the vehicle reduces speed as it passes the speed warning point. Thus the driver is not only given the warning as he begins to exceed the pre-set warning speed, but another audible indication will be given as he reduces speed to below the pre-set level or into the safe or legal range again.

Preferably the device of the present invention incorporates all components except the activation switch as an integral unit in a small, esthetically attractive housing, which may be mounted by adhesive means or the like directly to the plastic cover of the speedometer in a position which is out of the way but still convenient to the instrument, or it may be mounted on the instrument panel at a position closely adjacent the position of the activation switch. The activation switch and the warning device unit may be connected by a very fine, unobtrusive wire, since the current in the circuit is extremely low (on the order of a few ma.)

Although the invention herein is shown and described in the form of a speed warning device for ready installation in conjunction with an existing vehicle speedometer, it will be understood that it can just as well be used for providing a warning in conjunction with other types of indicating instruments. For example, the same type of system could be installed on a tachometer to provide a warning at excessive engine RPM's. It could also be incorporated, for example, in heat gauges, steam pressure gauges, and the like-- --indeed, in any kind of gauge which utilizes a pointer as an indicator and which has a face cover that may be readily drilled for mounting the activation switch.

BRIEF DESCRIPTION OF THE DRAWING

A better understanding of the present invention may be had from a consideration of the following detailed description, taken in conjunction with the accompanying drawing, in which:

FIG. 1 is a sketch of a speedometer in front elevation, illustrating the position of installation of one embodiment of the present invention;

FIG. 2 is a partial sectional view of the arrangement of FIG. 1, taken along the line 2—2 thereof;

FIG. 3 is a schematic view, partially broken away, of the activation switch of the arrangement of FIG. 1;

FIG. 4 is a schemtic diagram of an electrical circuit incorporated in the invention; and FIG. 5 is a schematic view, partially broken away, of a variation of the switch of FIG. 3.

DESCRIPTION OF THE PREFERRED EMBODIMENT

As shown particularly in FIG. 1, a system 10 of the present invention comprising a chassis unit 12 and an activation switch 14 with interconnecting wires 16 is represented as being mounted in place on the cover plate of a speedometer 18 installed in the instrument panel 20 of a motor vehicle. The speedometer 18 in conventional fashion has a speedometer pointer or needle 22 mounted in front of a face 24 for rotation about a central pivot axis 26 and protected by a transparent cover plate 30. The face 24, in conventional fashion, has a series of graduation marks 28 arranged as a speed scale which in the case depicted extends from 0–100 (indicated miles per hour or kilometers per hour).

Referring now to FIGS. 2 and 3, particular details of the switch 14 and its mounting in the plastic cover plate 30 of the speedometer 18 are depicted. The switch 14 principally comprises a metal sleeve 32 in cylindrical form which is hollow throughout its major extent. A fine conducting filament, preferably a metallic wire of a spring material such as beryllium copper approximately 0.5–2 mils in thickness is mounted in coaxial alignment within the metal sleeve 32 by an insulator 36. The wire 34 is resiliently flexible and is mounted by the insulator 36 in a cantilevered mounting so that its free end 38 extends outwardly from the distal or inward end 40 of the sleeve 32 in a manner which permits a very light force to bend the wire 34 to one side or another until it contacts the metal sleeve 32. The proximal end of the switch 14 is provided with a base 42 of larger diameter than the diameter of the metal sleeve 32. The insulator 36 may very well constitute the inner end of the base 42 (see FIG. 3) as the base 42 is preferably made of a plastic insulating material.

As indicated in the schematic of FIG. 4, the circuit of the invention preferably includes a battery 40, a transducer 43, an oscillator or other wave generator 44, and a power switch 46, all in series circuit with the activation switch 14 and connected thereto by the wires 16. The switch 46 is preferably of the push-buttom type which, in successive operations, cycles between on and off (closed and open) positions. The entire circuit, except for the activation switch 14 and connecting wires 16, is mounted within the housing of the unit 12. As indicated in FIG. 2, means for mounting the unit 12 on the speeometer cover plate 30 or some similar surface are provided. This means 48 may be an adhesive backing strip for adhesively mounting the unit 12, or the unit may be removably mounted by attachment with a releasable latching material such as Velcro, the base element of which may be adhesively attached to the mounting surface. The activation switch is mounted in place on the speedometer 18 by drilling a small hole 50 in the cover plate 30 of a dimension to receive the metal sleeve portion 32 of the switch 14. Preferably this should be a tight fit, although it may be such as to permit withdrawal of the switch 14 if it is desired to remove the system 10 or to move the switch 14 to a position adjacent a different speed setting. If the switch 14 is to be removed, the hole 50 may be closed by a small buttom type plug (not shown). In fact, a series of holes 50 could be drilled in the cover plate 30 for variably locating the switch 14 to provide warnings at different selected speeds with the empty extra holes 50 being filled by attractively colored, removable plugs, if desired.

From a consideration of FIGS. 1, 2 and 3, it may be seen that the end 38 of the wire 34 is long enough, when the switch 14 is properly mounted in the cover plate 30, to extend into the path of the speedometer pointer 22 as the pointer rotates about the pivot axis 26 in indicating the speed of the vehicle. Further movement of the pointer 22 in the right-hand direction in FIG. 3, say to a point approximately 58 miles per hour, will move the pointer past the end 38 of the wire 34 which then flips back to the central position away from the contact with the sleeve 32 so that the warning is terminated by the opening of the circuit.

An alternative embodiment of the present invention is illustrated in FIG. 5 which includes a light emitting diode (LED) or equivalent illuminating member to provide a dot of light at the point at which the switch 14 is installed, both to enable more rapid comparison with the position of the speedometer pointer 22 relative to the warning speed corresponding to the position of the switch 14 and also to provide an indiction that the circuit in which the activation switch 14 is connected is live. The LED 60 in switch 14a of FIG. 5 is connected across the terminals of the switch 14a. One LED lead 62 is electrically connected to the wire 16 which ties to the central wire member 34 of the switch 14a at a connecting point 64. The other LED lead 63 connects to the other wire 16 at the point 66 where it connects to the metal sleeve 32. Thus the LED 60 is energized as long as the activation switch 14a is open. However, as soon as the wire 34 is deflected by the pointer 22 to contact the sleeve 32, the electrical potential across the points 64, 66 is short-circuited and the LED 60 is deactivated. Removal of the short circuit between the wire 34 and the sleeve 32, as by reduction of speed or increase in speed so that the pointer 22 no longer maintains the two members in contact, serves to reactivate the LED 60 and restore the illumination as before. However, the sleeve 32 does not extend far enough to interfere with the pointer 22. As manufactured, it is contemplated that the sleeve 32 and wire 34 will be long enough to reach to the appropriate position in any speedometer commonly provided in automobiles. The sleeve 32 and wire 34 may then be shortened as necessary to accommodate the installation to a particular speedometer. Shortening of the sleeve 32 may be facilitated by providing a series of notches or perforations (not shown) at various increments along the length of the sleeve 32.

In the installation depicted, a switch 14 is located slightly past the 55 mph position on a speedometer 18. This corresponds with the national speed limit of 55 miles per hour and permits the driver to maintain such an indicated speed without triggering the warning device of the unit 12. However, as the speed increases beyond 55 miles per hour, the pointer 22 engages the wire 34 (see FIG. 3) and, at a position approximately 56 or 57 mph causes the wire 54 to contact the sleeve 32, thus closing the switch 14 and activating the oscillator 44 and associated transducer 43 to generate the audible warning signal.

There has thus been shown and described a particular annunicator or warning system in accordance with the present invention, particularly adapted for association with a vehicle speedometer to give speed warning signal, but also suitable for installation on similar dial-type indicators of general types of systems. The system of the invention may be installed very easily without the need for special technicians. It is small, lightweight and unobtrusive in position, and is low cost, effective and reliable. It may be easily removed with a minimum of disruption of the originally installed instrument or gauge with which it was associated.

The switch 14 or 14a herein is particularly adapted to utilization in the system described herein and in similar types of systems. It is useful in such a system because it can be activated without substantial force, thus responding to the lightly driven pointer of the associated instrument without disturbing the operation of the instrument. It could be employed, with little more elaboration, in a system to regulate the speed of an automobile, not just to provide a warning of the speed having reached a predetermined point. Other uses for a switch of this type may occur.

Although there have been described above specific arrangements of a speed warning system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An annunciator system for mounting in association with a speedometer or the like, comprising:
   an annunciator unit having an electrical circuit operable by a switch to generate an audible signal; and
   an activating switch connected in said circuit and adapted for mounting from outside an instrument adjacent a movable indicator of the instrument at a selected warning position, the switch having a fine, resiliently flexible, conducting filamentary member supported from an insulated support member within the switch in a cantilever mounting and extending outwardly from a body of the switch into the path of the indicator of the instrument for deflection by the indicator to a position of closure of said switch, the switch comprising a body having a generally cylindrical portion of reduced diameter extending along the filamentary member and a base portion of larger diameter relative to the diameter of the other portion to facilitate mounting of the switch in a hole in the cover plate of the instrument.

2. Apparatus of claim 1 wherein the switch comprises a hollow cylindrical metal sleeve encircling the conducting filamentary member.

3. Apparatus in accordance with claim 2 wherein the filamentary member is coaxially mounted within the sleeve.

4. Apparatus in accordance with claim 3 wherein the metal sleeve is adapted to extend to a length which is shorter than the filamentary member and constitutes one contact of the switch.

5. Apparatus in accordance with claim 4 wherein the length of the filamentary member extending beyond the metal sleeve is such that an instrument pointer engaging the end of the filamentary member to move the filamentary member into contact with the sleeve may readily move past the position of said contact to release the filamentary member from said contact.

6. An electrical switch adapted for activation in response to the application of the application of very slight force comprising:
   a substantially hollow conducting metal cylinder sleeve of reduced diameter and further including a base member at one end of the cylinder of a second diameter greater than the said reduced diameter, the base member and the cylinder being configured to adapt the switch for mounting with the cylinder extending through a small mounting hole and held therein by said base, said sleeve constituting a first contact of the switch; a resiliently flexible filamentary member constituting a second contact of the switch, and extending beyond a distal end of the sleeve remote from the mounting means for lateral engagement by an activating element of an associated device;
   insulating means mounting the filamentary member coaxially within the sleeve adjacent a proximal end thereof in a cantilevered support arrangement; and
   a pair of electrical conductors connected respectively to the sleeve and filamentary member.

7. The switch in accordance with claim 6 wherein the base member constitutes the mounting means for the filamentary member.

8. The switch of claim 7 further including an illuminating element connected across the connections to the filamentary member and the sleeve for energization by a voltage across the switch and de-energization by the establishment of electrical contact between the filamentary member and the sleeve.

9. The switch of claim 8 wherein the illuminating element comprises a light emitting diode embedded in the base member in a position to be visible therein.

10. The switch of claim 8 wherein the switch contacts are closed by movement of the filamentary member to touch the sleeve at the distal end thereof.

11. A combination instrument and annunciator for providing a warning signal comprising:
    an instrument having a movable indicator mounted within a housing including a cover plate;
    an activation switch mounted adjacent a selected position of the indicator at which the warning is to be given, said switch including first and second conducting elements, the first element comprising a fine resiliently flexible filamentary member projecting into the path of the indicator and movable by said indicator into a position of contact with the second conducting element, said switch adapted to permit the indicator to move past the position of contact of the filamentary member with said second conducting element and thereby release the filamentary member from said position of contact, and an annunciator connected to the switch and having an annunciator circuit adapted to be closed by the contact of the filamentary member with said second conducting element.

12. The combination of claim 11 wherein said second conducting element comprises a cylindrical metal sleeve encircling the filamentary member, the filamentary member extending outwardly from a distal portion of said sleeve, and further including insulating means within the proximal portion of the sleeve for supporting the filamentary member in a centilever mounting.

* * * * *